June 20, 1933.  L. E. LA BRIE  1,914,996
WHEEL
Filed Oct. 21, 1925
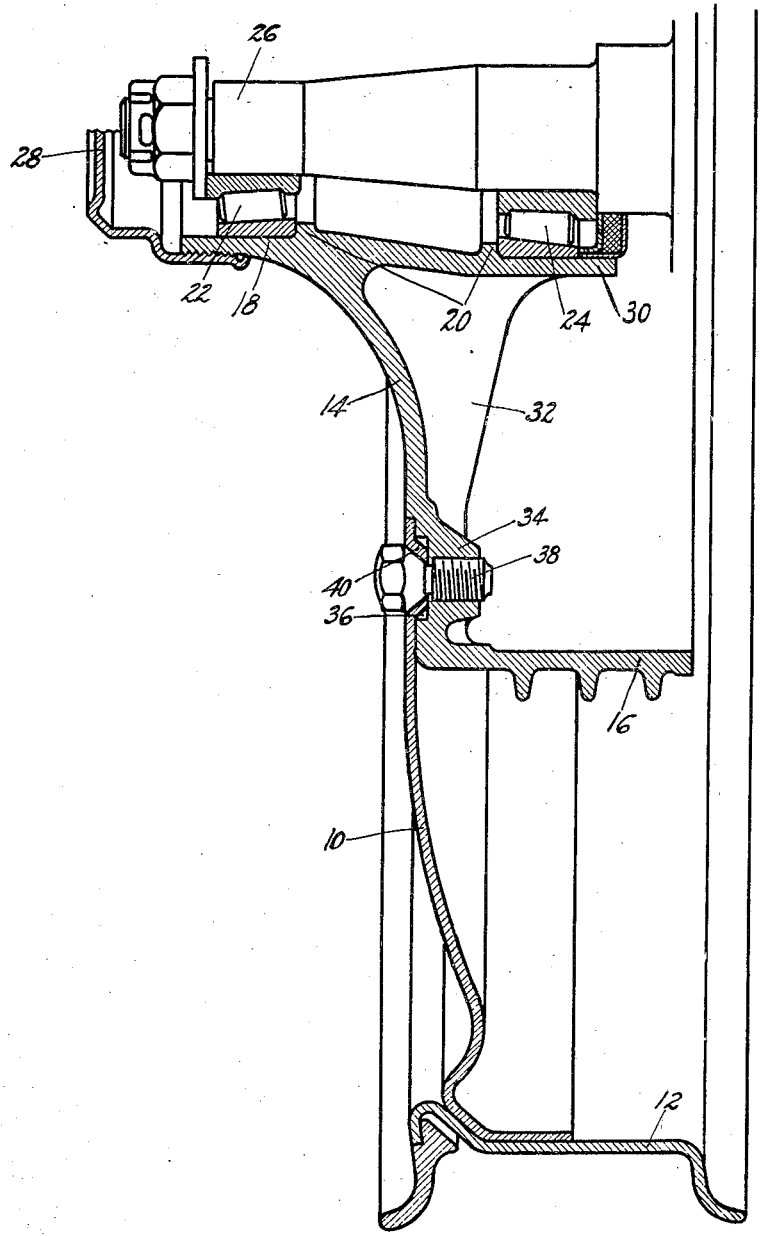
INVENTOR
LUDGER E. LA BRIE
BY
*M. W. McConkey*
ATTORNEY Patented June 20, 1933

1,914,996

UNITED STATES PATENT OFFICE

LUDGER ELIZÉ LA BRIE, OF SOUTH BEND, INDIANA, ASSIGNOR, BY MESNE ASSIGNMENTS, TO BENDIX BRAKE COMPANY, OF CHICAGO, ILLINOIS, A CORPORATION OF ILLINOIS

WHEEL

Application filed October 21, 1925. Serial No. 63,841.

This invention relates to wheels, and is illustrated as embodied in a front automobile wheel having a brake drum. An object of the invention is to provide a strong and inexpensive wheel having a very attractive appearance, and preferably having a smoothly-curving substantially-continuous outer face extending from the outer end of the hub to the rim.

In one desirable arrangement, the wheel is made in two separate inner and outer parts, the latter being an annular rim-carrying disk. The novel inner part, preferably comprising a hub and brake drum in one piece, may be a casting, and is arranged with a smoothly-flaring outer face terminating in a rabbet receiving the inner edge of the outer disk. The inner part of the hub may, if desired, be braced by radial ribs connecting it to the inner face of the head of the brake drum.

Another feature relates to securing the parts together by fastenings arranged to draw parts of the disk, preferably under tension, into recesses in the side face of the above-described rabbet.

These and other objects and features of the invention, including various novel combinations of parts and desirable particular constructions, will be apparent from the following description of one illustrative embodiment shown in the accompanying drawing, in which:

The figure is a radial section through one-half of the wheel.

The wheel includes an outer annular pressed steel disk 10 carrying a rim 12, and seated at its inner edge in an annular rabbet formed at the outer edge of the head 14 of a brake drum 16. Head 14 is shown as a flange projecting from a hub 18 having near its ends shoulders 20 positioning antifriction bearings 22 and 24 serving to mount the wheel on the spindle 26 of the front wheel knuckle. The end of hub 18 is threaded to receive the hub cap 28.

It will be noted that head or flange 14 flares smoothly from the end of hub 18, and makes a flush joint with disk 10, so that there is a smoothly-curving substantially-continuous surface from the outer end of the hub clear to the rim, thus adding materially to the appearance of the wheel. The inner end 30 of the hub may be braced by radial ribs 32 extending from the hub to the inner face of head or flange 14. I prefer to make the above-described novel one-piece hub and brake drum as an iron casting.

The head or flange 14 is thickened at intervals on its inner side to form bosses 34, having threaded openings within recesses 36 in the side face of the rabbet. Fastenings 38, shown as machine screws, preferably have conical heads, or other parts, in conical seats 40 formed in disk 10. I prefer that disk 10 be formed so that a concave surface engages the side of the rabbet, so that fastenings 38 draw it in under tension until seats 40 engage the bottom of the recesses 36.

While one illustrative embodiment has been described in detail, it is not my intention to limit the scope of the invention to that particular embodiment, or otherwise than by the terms of the appended claim.

I claim:

A wheel comprising, in combination, an inner supporting member terminating in an annular rabbet at its outer edge, together with an outer annular concaved rim-carrying disk seated in said rabbet at its inner edge and secured to the drum, there being recesses in the side face of said rabbet and bosses on the inner side of the supporting member opposite the recesses and formed with threaded openings centrally of the recesses, the disk having conical seats projecting into the recesses, and fastenings projecting through the disk and threaded into the openings and having conical parts in said seats said fastenings serving to distort said concaved disk, placing the same under tension and seating said conical seats within said recesses in the supporting members.

In testimony whereof, I have hereunto signed my name.

LUDGER ELIZÉ LA BRIE.